US012651265B2

(12) United States Patent
Crudele et al.

(10) Patent No.: US 12,651,265 B2
(45) Date of Patent: Jun. 9, 2026

(54) TRANSACTION RECONCILIATION AND DEDUPLICATION

(71) Applicant: Steady Platform LLC, Atlanta, GA (US)

(72) Inventors: Marcel Crudele, Atlanta, GA (US); Jason Robinson, Atlanta, GA (US); Elizabeth Wylie, Atlanta, GA (US); Andrew Toloff, Atlanta, GA (US); Nathan Crockett, Atlanta, GA (US); Evan Johnson, Atlanta, GA (US); Amanda Miguel, Atlanta, GA (US); Tyler Howard, Atlanta, GA (US); Winn Martin, Atlanta, GA (US)

(73) Assignee: STEADY PLATFORM, INC., Atlanta, GA (US)

( * ) Notice: Subject to any disclaimer, the term of this patent is extended or adjusted under 35 U.S.C. 154(b) by 5 days.

(21) Appl. No.: 17/835,044

(22) Filed: Jun. 8, 2022

(65) Prior Publication Data

US 2022/0398583 A1 Dec. 15, 2022

Related U.S. Application Data

(60) Provisional application No. 63/208,528, filed on Jun. 9, 2021.

(51) Int. Cl.
*G06Q 20/40* (2012.01)
*G06N 20/00* (2019.01)

(52) U.S. Cl.
CPC .......... *G06Q 20/405* (2013.01); *G06N 20/00* (2019.01); *G06Q 20/407* (2013.01)

(58) Field of Classification Search
CPC .. G06Q 20/405; G06Q 20/407; G06Q 40/125; G06Q 40/12; G06N 20/00; G06N 3/045; G06N 3/09

(Continued)

(56) References Cited

U.S. PATENT DOCUMENTS 6,128,602 A * 10/2000 Northington ........ G06Q 20/102
705/40
10,460,391 B2 10/2019 Caldwell
(Continued)

*Primary Examiner* — Eduardo Castilho
*Assistant Examiner* — Karlyannie M. Garcia
(74) *Attorney, Agent, or Firm* — Buckley, Maschoff & Talwalkar LLC

(57) ABSTRACT

Provided are systems and methods for reconciling transactions from different financial accounts via machine learning. In one example, a method may include storing a data file comprising a plurality of electronic transactions and a plurality of transaction records corresponding to the plurality of electronic transactions in memory, inputting the data file into a first machine learning model and identifying respective transaction attributes of the plurality of transaction records based on the input data file, determining, via execution of a second machine learning model, that a first transaction and a second transaction in the data file correspond to a common transaction based on attributes of the first and second transactions which are identified from respective transactions records of the first and second transactions, and modifying the data file to indicate that the first and second transactions correspond to the common transaction and storing the modified data file in the memory.

19 Claims, 8 Drawing Sheets

100

(58) Field of Classification Search
USPC .......................................................... 705/64
See application file for complete search history.

(56) References Cited

U.S. PATENT DOCUMENTS

| | | | |
|---|---|---|---|
| 10,510,113 B2 | 12/2019 | Caldwell | |
| 10,984,468 B1 | 4/2021 | Hockey et al. | |
| 2018/0218448 A1 | 8/2018 | Thomas et al. | |
| 2019/0066203 A1 | 2/2019 | Smith et al. | |
| 2019/0318347 A1* | 10/2019 | Aguiar | G06Q 20/10 |
| 2020/0137080 A1 | 4/2020 | Bloomquist et al. | |
| 2021/0233162 A1 | 7/2021 | Hockey et al. | |
| 2021/0326980 A1 | 10/2021 | Thomas et al. | |
| 2022/0284502 A1* | 9/2022 | Elder | G06Q 30/012 |
| 2022/0309580 A1* | 9/2022 | Aiba | G06Q 40/04 |
| 2022/0382723 A1* | 12/2022 | Rama | G06N 3/045 |
| 2022/0405836 A1* | 12/2022 | Gorman | G06Q 40/12 |
| 2023/0186667 A1* | 6/2023 | Goyal | G06V 10/761 |
| | | | 382/181 |
| 2023/0409644 A1* | 12/2023 | Wu | G06F 16/93 |

* cited by examiner

| Data Source | Date | Amount | String | Counter-Party |
|---|---|---|---|---|
| Payroll Processor | 1/11/2021 | $1000 | Acme | John Smith |
| Check Acct. Bank A | 1/15/2021 | $1000 | PID*5638##1/11 SMITH JOHN | Acme |

| Data Source | Date | Amount | String | Counter-Party |
|---|---|---|---|---|
| Check Acct. Bank A | 1/22/2021 | $602 | Transfer to Bank 2 checking | |
| Check Acct. Bank B | 1/22/2021 | -$600 | CHKXFER 23578 | |

| Data Source | Date | Amount | String | Counter-Party |
|---|---|---|---|---|
| Check Acct. Bank A | 1/27/2021 | -$350 | Payment | |
| Credit Card Acct. A | 1/27/2021 | $347 | Payment | |

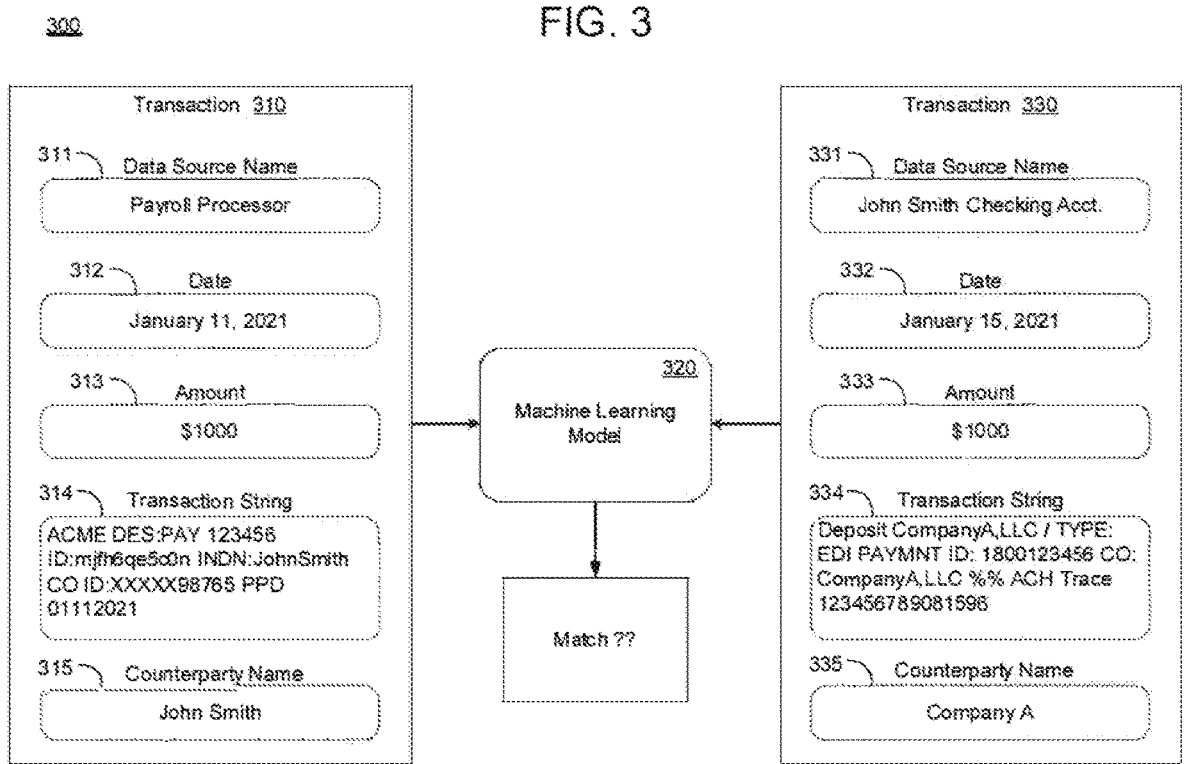

Transaction 310

311 — Data Source Name
Payroll Processor

312 — Date
January 11, 2021

313 — Amount
$1000

314 — Transaction String
ACME DES:PAY 123456
ID:mjfh6qe5c0n INDN:JohnSmith
CO ID:XXXXX98765 PPD
01112021

315 — Counterparty Name
John Smith

320
Machine Learning
Model

Match ??

Transaction 330

331 — Data Source Name
John Smith Checking Acct.

332 — Date
January 15, 2021

333 — Amount
$1000

334 — Transaction String
Deposit CompanyA,LLC / TYPE:
EDI PAYMNT ID: 1800123456 CO:
CompanyA,LLC %% ACH Trace
123456789081598

335 — Counterparty Name
Company A

FIG. 4                                                                                          400
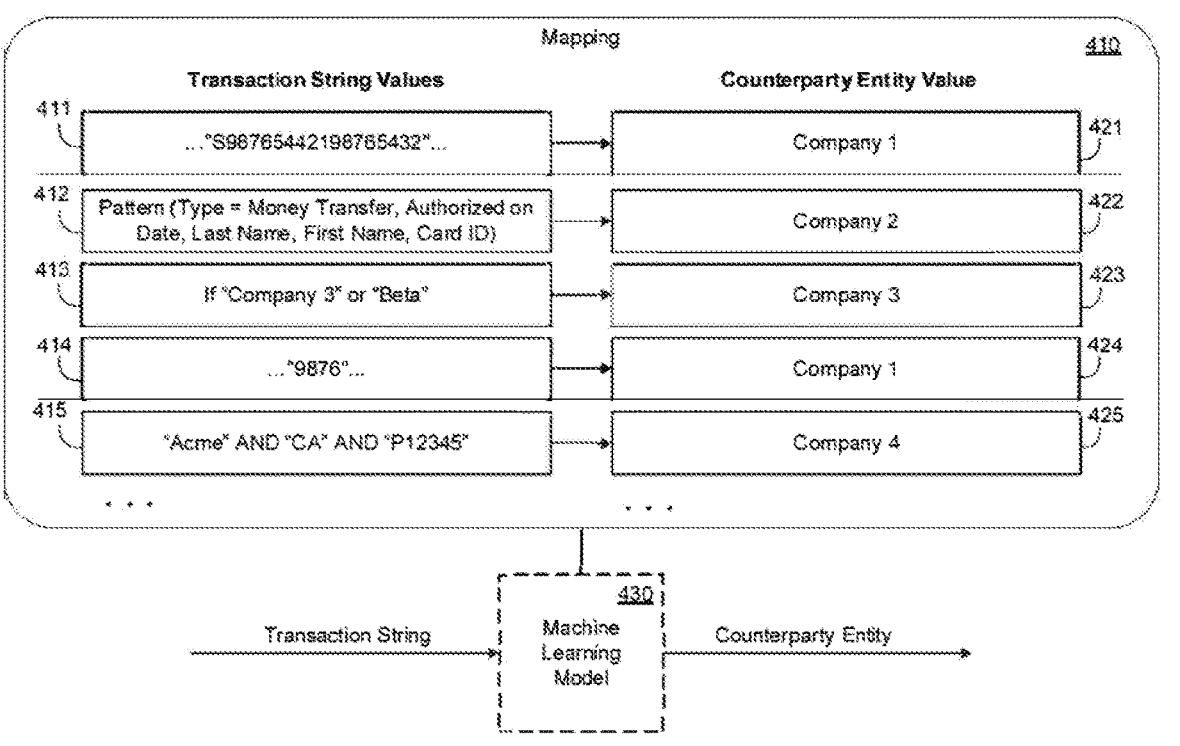

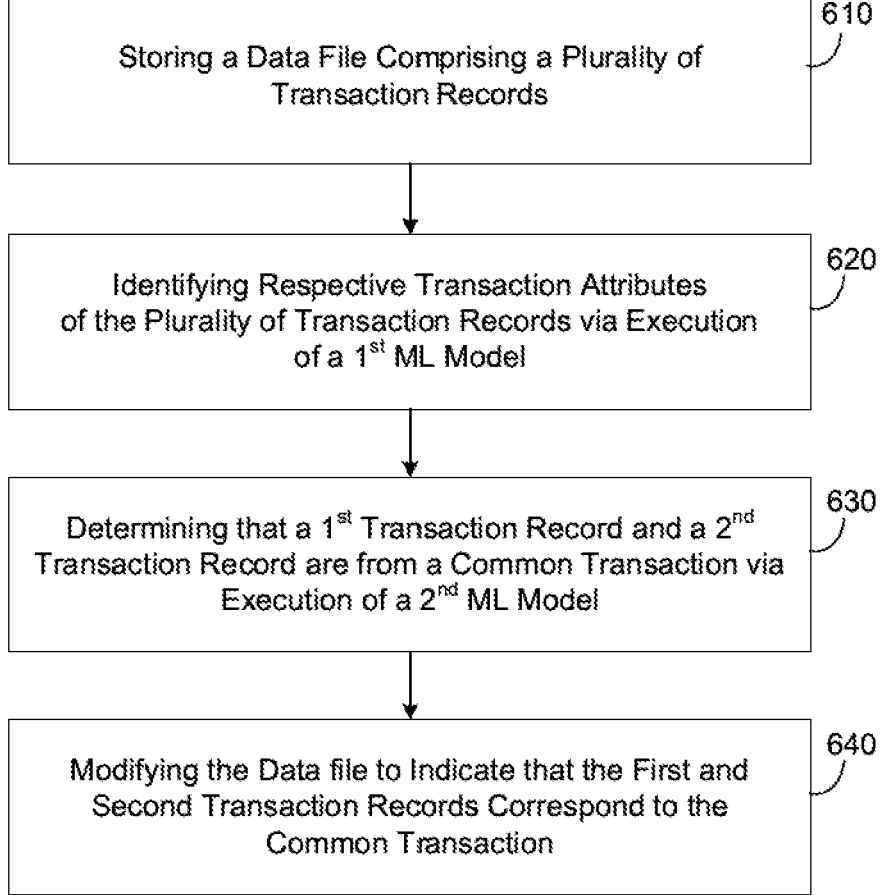

610

Storing a Data File Comprising a Plurality of Transaction Records

620

Identifying Respective Transaction Attributes of the Plurality of Transaction Records via Execution of a $1^{st}$ ML Model

630

Determining that a $1^{st}$ Transaction Record and a $2^{nd}$ Transaction Record are from a Common Transaction via Execution of a $2^{nd}$ ML Model

640

Modifying the Data file to Indicate that the First and Second Transaction Records Correspond to the Common Transaction 700    FIG. 7
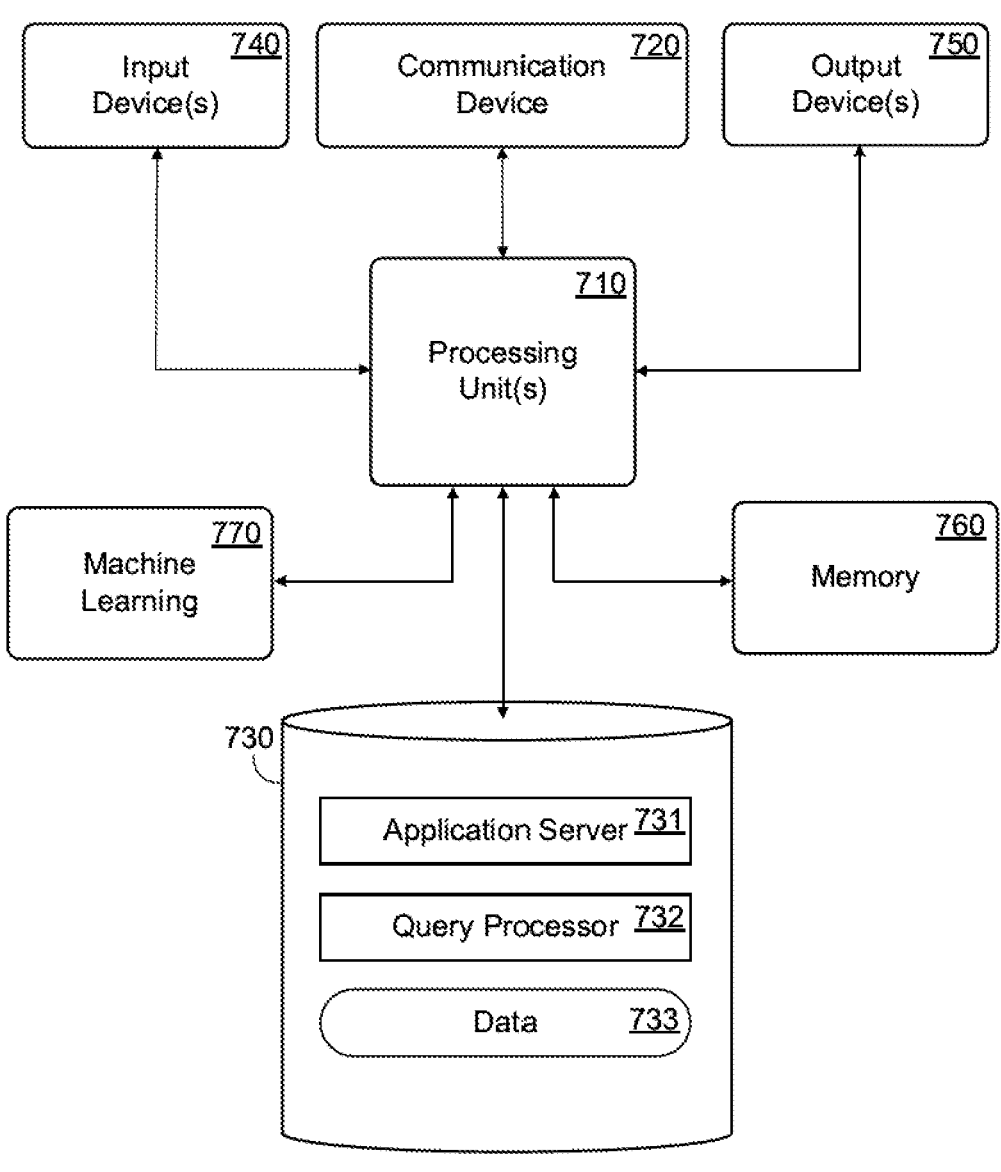

TRANSACTION RECONCILIATION AND DEDUPLICATION

CROSS-REFERENCE TO RELATED APPLICATION(S)

This application claims the benefit under 35 USC 119(e) of U.S. Provisional Patent Application No. 63/208,528, which was filed on Jun. 9, 2021, in the United States Patent and Trademark Office, the entire disclosure of which is hereby incorporated by reference for all purposes.

BACKGROUND

When a financial account is used in a financial transaction, for example, a payment to another, receipt of funds, transfer of funds, etc., a record is typically created by the financial institution that issued the financial account. As an example, in the case of a record in the form of a transaction string, that record could be represented or otherwise embodied as a collection of text that provides details about a financial transaction. In particular, that transaction string may include helpful information about the transaction such as a date, a location, a type or purpose of the transaction, and ideally, an identifier of a counterparty entity (e.g., the entity that owns the other account) involved in the transaction. However, these transaction records may be stored in substantially different formats. For instance, the transaction record may have information separated into various parameters such as date, amount, payor, payee, transaction category (e.g. transfer, refund, income, ATM deposit, etc.), etc. and may or may not include a transaction string.

On the other side of the payment transaction is another financial account or set of accounts held by some party or parties, which could be the same entity, another entity, or several entities. For each of these financial account(s), the owner of the corresponding financial account(s) on the other side of the transaction is referred to herein as a counterparty or counterparty entity. Each of these financial accounts is also typically provided with a transaction record from the financial institution which issued the financial account. However, this transaction record may be significantly different from the transaction record provided by the financial institution that issued the other financial account. Thus, because different transaction records may contain different levels of information and details, and these records can exist in various forms, formats, and embodiments, knowing whether or not transaction records might relate together or even duplicate each other is often not trivial.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a process of reconciling transaction data from different sources in accordance with an example embodiment.

FIGS. 2A-2C are diagrams illustrating a process of matching transactions from different accounts in accordance with example embodiments.

FIG. 3 is a diagram illustrating a process of matching transactions via a machine learning model in accordance with an example embodiment.

FIG. 4 is a diagram illustrating a process of mapping transaction strings via a machine learning model in accordance with an example embodiment.

FIG. 6 is a diagram illustrating a method of matching transactions via machine learning in accordance with an example embodiment.

FIG. 7 is a diagram illustrating a computing system for use in the example embodiments described herein.

Figure 5A:
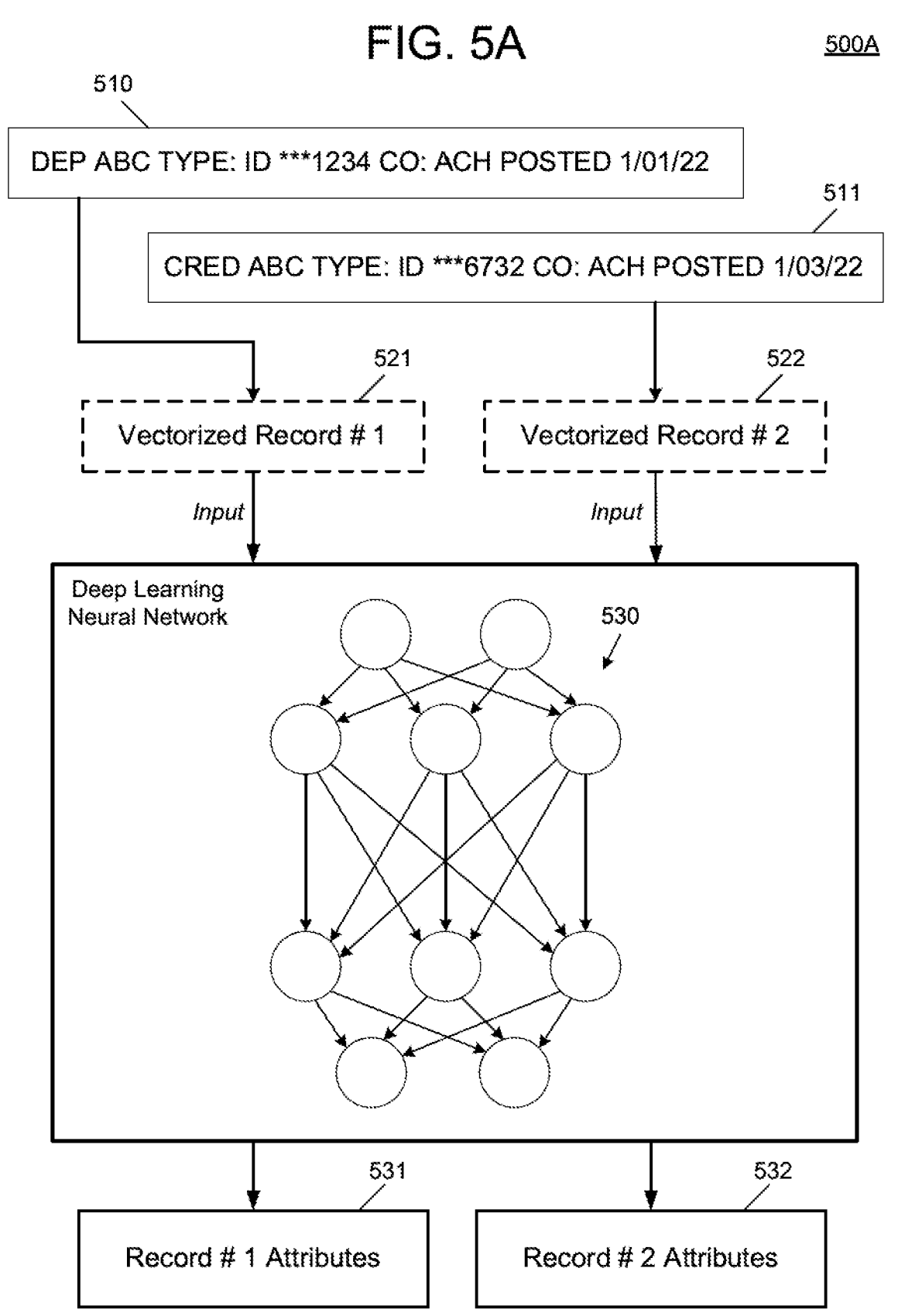
FIG. 5A is a diagram illustrating a process of a machine learning model identifying transaction attributes from a transaction record in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but it is to be accorded the widest scope consistent with the principles and features disclosed herein.

The example embodiments are directed to a platform that can match transaction records between different financial accounts based on heuristics, machine learning, and/or machine-learning-generated heuristics. Furthermore, the platform can perform additional learning on the transaction records when matched records are aggregated together. The transaction records may be embodied in the form of digital documents such as bank statements, spreadsheets, data files (e.g., CSV, XML, JSON, etc.), and the like. The platform may read data values from a transaction stored/embodied in a first document/record and read data values from another transaction stored/embodied in a second document/record, and determine whether to two transactions from different banks or other financial institutions are the same transaction (e.g., from different sides of the transaction, etc.). Different sides of a transaction may refer to a payor and a payee, such as a payroll processor and an employer, or the like. Deduplication and reconciliation can also occur between accounts of an individual as transfers such as between credit and debit card accounts or the like. Similarly, the deduplication process can identify redundant transactions that might be credits or debits, in the case of multiple data sources overlapping. The deduplication process can identify two duplicate or redundant transaction records and delete one of them when creating the modified data file. As another example, the deduplication process can combine unique attributes from two matching transaction records (such as two transaction records from opposing sides of a transaction) into one aggregated transaction record.

Each transaction record may include various data fields that are embedded therein and created when the payment transaction is processed via a payment network, staged for later processing, or otherwise prepared or processed. The transaction record may include an identifier of the account (e.g., account number, last 4 digits of the account, etc.), a date of the transaction, an amount, and a transaction string. However, not all transaction records include a transaction string. For example, a payroll payment from a payroll processor may include fields in the transaction record which are not processed by a payment network and which do not have a transaction string. Here, other attributes of the transaction record such as date, source, amount, etc., may be used to match the transaction record to another transaction record, even one that has a transaction string.

In some embodiments, the host platform may also perform a machine learning process on the transaction record to identify a counterparty entity to the transaction. The host platform may modify the transaction records with the information about the counterparty entity or other relevant differentiators, features, and/or identifiers learned via machine learning. Furthermore, the host platform may train one or more machine learning models based on the transaction data to generate various analytical applications. In some embodiments, the host platform may perform a heuristics-based extraction process, which may be composed of machine-learning-generated rules based on a machine learning model or models, as well as a machine learning process on the transaction record to identify a counterparty entity to the transaction.

Transaction records can be more tailored to machine understanding than to human interpretability. Thus, the system described herein may identify features of the transaction that are not expressly included in the transaction record that a human could not readily ascertain. These machine learning processes may be composed of many machine learning algorithms and techniques, and rules that compose heuristics may be generated by a combination of various machine learning algorithms, for example, unsupervised learning, supervised learning, dimensionality reduction, and natural language processing.

In many cases, machine learning models improve with more data. In other words, the accuracy of the predictions, reliability of clustering, or quality of entity extractions made by a machine learning model improve when the quality of the training data that is processed by the machine learning algorithm, such as a neural network, or combination of algorithms, such as a pipeline of supervised and unsupervised machine learning algorithms, is increased. According to various embodiments, provided is a matching service which can match together opposing transaction records across different accounts of a same transaction thereby creating a larger (i.e., aggregated) data record for a given transaction. By matching together data records, the example embodiments enable data to be aggregated together, such as in the case in two opposing sides of the same transaction. In addition, by matching together transaction records, the example embodiments also enable deduplication, such as in the case when merging two different copies of partially overlapping transaction records. In addition to opposing transactions—such as the credit/debit relationship between a payroll processor and deposit account—the machine learning model can be used in a more general case. For example, a more general example could be a data export of all financial transactions from multiple accounts from a financial management tool like Mint and comparing that to a separate dataset from only one account that is a subset of the Mint set. The example embodiments can help identify and deduplicate the overlap in this example. The deduplication process may delete one of the transaction records from the generated data file thereby ensuring that only one of the duplicate records is used for future processing.

In the example embodiments, financial institutions (FIs) refer to organizations, companies, etc., which engage in financial and monetary transactions such as deposits, loans, investments, and currency exchange for both individuals and businesses. They include, but are not limited to, retail and commercial banks, Internet banks (or neo-banks), credit unions, savings and loan associations, investment banks and companies, trust companies, insurance companies, brokerage firms, mortgage companies, mobile and digital wallet applications, payment service providers (PSPs), payroll processors, electronic commerce companies, and the like. Financial institutions offer a variety of financial accounts including, but not limited to, checking accounts, savings accounts, money market accounts, certificates of deposits, home equity loans, auto loans, personal loans, credit cards, prepaid debit cards, payroll cards, and the like.

Financial accounts have an associated account balance that is affected by credits and debits and quantifies the financial holdings within the accounts. Financial accounts include checking accounts, savings accounts, money market accounts, certificates of deposit, home equity loans, auto loans, personal loans, credit cards, prepaid debit cards, payroll cards, etc. Each financial record is referred to as a transaction, with examples of a transaction including, but not limited to, deposits, interest, refunds, fees/penalties, withdrawals, transfers, charges, and the like. Transactions are not only found in financial accounts, but also within payments to workers, such as by payroll processors and the like, which can be or act as an agent on behalf of another payor. Other examples include, but are not limited to, human resource systems, and the like.

Furthermore, a transaction record can include several pieces of data, such as the date of the transaction, the amount of the transaction, whether it was positive or negative change to the account balance, the transaction string, and the like. The data that is included in a respective transaction record may differ depending on the financial entity or institution that generates the transaction record. In other words, there is no universal format that all financial institutions use to generate transaction strings. Rather, it is up to the subjective preferences of the institution.

Transaction records may include an associated transaction string, which is a collection of text that provides additional detail about the transaction and might include additional date information, location information, type or purpose of the transaction, and ideally a description of the other entity involved in the transaction, apart from the owner of the financial account. In this case, the transaction record may be taken from a bank statement or transaction history of the financial account and may include a deposit from another entity, a payment another entity, or the like. In the example embodiments, the other entity on the opposite side of the transaction is referred to herein as the counterparty entity.

For example, transactions may occur between two or more entities. Examples include, but are not limited to, employer and employee, such as a transaction of payment to employee for work; a merchant and customer, such as a transaction of money in exchange for goods and services;

person to person; a person to themselves, such as a transaction moving funds from a checking to a savings account; and the like. When examining a transaction from a specific source (e.g., a financial entity of a financial account holder involved in the transaction), that record belongs to that specific entity. The entity on the other side of the transaction is the counterparty entity. For example, a deposit in a person's checking account issued by the person's bank might have a counterparty entity of an employer, a merchant (in the case of a refund), or the person themselves (in the case of making a deposit at an ATM or a transfer from another account).

An example of a counterparty entity is an employer when the transaction involves a payment (such as payroll) deposited into an account of an employee. Here, the employee is the target entity and the payor (in this example the employer) is the counterparty entity, from the perspective of the employee's account. Now, on the other side of the transaction, the employer will also receive a bank statement or record of the transaction from their bank. In this case, the employer's bank would reference the employer owning the account as the target entity and the employee as the counterparty entity. Thus, the target entity and counterparty entity of a transaction may be different, depending on whether the record is reflecting one side of a transaction or another.

Another example of a counterparty entity is a merchant when a consumer purchases services or goods from the merchant and the consumer is the target entity. Another example of a counterparty entity is a person (peer-to-peer) when there is payment from the person to another person (target) or from the other person. Another example is that the sender of the money may also be the receiver of the money, for example, when money is transferred from one account to another. In this case, the counterparty entity would also be the target entity. Accordingly, when examining a transaction from a specific financial account source, such as a bank statement or a transaction history, that record belongs to a target entity of the source. The entity on the other side of the transaction is the counterparty entity.

In the example embodiments, reconciliation refers to the ability to identify the relationship between transactions. One example of how such matching can be performed is based on the counterparty entity of the transaction when viewing the transaction from the other entity's account/transaction record. Examples include matching a payroll disbursement to deposits across one or more depository accounts, matching a credit card payment from a bank account to a corresponding credit card company, and matching transfers between two depository accounts. The analytic problem can be illustrated with an example. Take the case that a user has connected six sources of transaction data to the host platform including Bank 1 (checking and savings), Bank 2 (checking), a mortgage company, a credit card, a payroll processor used by their employer, and the employer. Here, the host platform may analyze factors within the user's income, spending, bill payments, etc., and provide recommendations and other analytics via machine learning. Reconciliation identifies, for instance, a transfer of funds from the savings account of Bank 1 to the checking account of Bank 1 or the checking account of Bank 2, payments from one of the bank accounts to the mortgage company or credit card, income from the payroll company to one or more of the bank accounts (disbursement could be split between accounts), income from the employer to any of the bank accounts, and the like. This avoids misinterpretation of transactional data, for instance, eliminating the case where a transfer of funds from one user account to another is incorrectly interpreted as work income.

While reconciliation identifies the relationship between transactions, deduplication applies that understanding to make sure transactions are not over-represented in display, analysis, and the like. While reconciliation identifies corresponding transactions to balance credits and debits, deduplication identifies overlapping transactions of the same type. For example, in the case that there are two transaction data sets, both from the same financial institution and accounts with overlapping date ranges. It becomes important to identify and consolidate the overlapping transaction records to avoid redundancy while the details of each transaction record may vary slightly, including, but not limited to, dates, amounts, transaction categories, and transaction strings. Another example is in the case that payment records are provided by both a payroll processor and the employer themselves, meaning there are two sources with providing payment records for each payment. In these examples, without deduplication, the host platform may perform an initial calculation that may simply sum all transactions across the accounts and result in misleading results. Deduplication prevents this from happening.

The example embodiments are directed to a host platform with a software program(s) installed and deployed therein that can automatically match together transaction records from across different accounts using machine learning techniques, machine learning informed or constructed heuristics, and the like. The machine learning processing may be performed by a machine learning service that includes multiple types of machine learning models, including but not limited to a machine learning model or models that can clean transaction records and/or strings and a machine learning model or models that can match transactions, which may or may not include transactions strings, including matching transactions based on the cleaned transaction records and/or strings and the attributes identified by the record and/or string cleaning machine learning process. In particular, some transactions may not have transaction strings, such as transactions associated with payroll accounts. However, the system herein can still perform matching. Furthermore, the record and/or string cleaning process may identify specific attributes of a transaction from a transaction record and/or string and pair those attributes with any other reconciled/matched transaction records in the document such that the record is "enhanced" to include additional features not initially created when the record was added to the user's bank account, employment records, or the like. In other words, additional transaction attributes from a counterparty's transaction (or transaction record and/or string) may be aggregated together with attributes of the transaction from a transaction record and/or string of a target entity, thereby creating a fuller record which can be used for even more learning. By enhancing transaction records, a reconciliation machine learning model may more accurately match together multiple transaction records that embody partial or full representations of a same, common transaction, such as a payroll record that matches with deposits into more than one account.

Furthermore, the host platform with the machine learning service may also perform machine learning and other analytics on an aggregation of matched transaction records. The example embodiments may include a variety of techniques to automate the reconciliation and deduplication process. As an example, parameter-based exact matching may be performed. This process compares the parameters associated with transactions from different datasets, such as a name of a payment source, a date of the transaction, an amount, a transaction string, and any metadata that might have been applied to the transaction. An example of this type of metadata is the counterparty entity that may be identified using machine learning such as described in the example of FIG. 4, and the like. The payment source may be a payor, a payee, or the like.

As another example, parameter-based estimated matching may be performed. This process may use similar parameters described for manual reconciliation but takes into account that certain parameters may not be exact, which may be described as a "fuzzy matching" process in some embodiments. In other words, by using machine learning for estimated matching, the example embodiments can match together transaction records when the data is not identical. For example, a payment transaction from a payroll processor to a person on a specific date may not appear for a few days in the person's depository account. Similarly, the amount of a disbursement may not be for the exact amount deposited in a single account, possibly because the payout was split between multiple deposit accounts or because the disbursement incurred a fee that would make the deposit amount slightly less. As another example, the transaction records and/or strings may be significantly different from one another, so advanced or enhanced processes to recreate the most likely set of component transactions may be required for transaction reconstruction purposes. In some cases, a user may provide for confirmation or manual approval of the matched transaction records.

Automated reconciliation can eliminate or dramatically reduce the need for manual efforts to reconcile and deduplicate transaction records across different financial accounts. However, there is the possibility that such efforts might be needed for a subset of transactions. In these edge cases, automated reconciliation and deduplication may dramatically reduce the number of transactions that need this additional attention, while helpfully grouping the relevant transactions that need to be manually resolved.

The problem may be better illustrated with an example. Take the case that a user has connected to multiple sources of transaction data:

Bank 1 (checking and savings accounts of the user)
Bank 2 (checking account of the user)
PAYPAL® account of the user
mortgage company account of the user
A credit card account of the user
The payroll processor used by an employer of the user
A gig platform from which the user earns additional income Transactions between these accounts can be substantial. For instance, a transfer of funds could occur from the savings account of Bank 1 to the checking account of Bank 1 or the checking account of Bank 2. Another example is a transfer of funds from the PAYPAL® account to one of the bank accounts. Another example is payments from one of the bank accounts to the mortgage company account or credit card account. Another example is income from the payroll company to one or more of the bank accounts, because the disbursement could be split across more than one account. Another example is income from the gig platform to a bank account or the PAYPAL® account.

In addition, there might be transactions where only partial information is known. An example of this case is a deposit to a checking account from another income source the user has not connected to the system (e.g. another employer, an investment account distributing a dividend, a cash gift sent by a friend or family member, etc.). Another example is a payment to a credit card or loan the user has not connected. Another example is various expense transactions related to purchases.

Extending this example, consider an application that determines a user's total work income. An initial attempt at that calculation might simply sum all deposits across all depository accounts. If the user has not connected the depository account where payroll and gig platform income is deposited, then that information would be missing from this calculation. Reconciliation may be used to identify deposits that are actually transfers from other accounts and remove those transactions from the work income calculation to improve accuracy and correctness of the calculation. For income from the payroll processor and gig platform in the example above, the user may or may not have linked the accounts where those funds are deposited. If not represented in a depository account, the transactions from the payroll processor and the gig platform would contribute to the calculated income. If the depository account has been connected, reconciliation would identify the overlapping transactions and deduplication would make sure those income events were only counted once.

In addition to using machine learning and related processes to reconcile transactions and perform deduplication, the host platform may also perform income verification using the reconciled transactions. For example, by identifying duplicate and even counterparty transaction records and/or strings, these transactions can be ignored or otherwise removed from further income verification. Income verification may be used for various services, including the distribution of funds, aid, government grants, basic income, universal basic income, and the like. Income verification may also be used to determine whether a person is who they say they are and can thus be used for identity verification as well.

An example of income verification is described in U.S. patent application Ser. No. 17/580,721, filed on Jan. 21, 2022, in the United States Patent and Trademark Office, which is fully incorporated herein by reference for all purposes. In particular, the reconciled transactions created by the machine learning system described herein may be input into the verification platform described in co-pending U.S. Ser. No. 17/580,721, for purposes of verifying income. Before such income can be verified, the host platform may reconcile and deduplicate transactions to prevent double-counting of transactions from an income verification process. For example, the income verification program may use the reconciled transactions when determining a net income or a total income of the user based on transaction records and/or strings from different accounts.

Furthermore, the transaction data that is consumed by the system described herein may be acquired or otherwise ingested from external data sources via a data ferret that is further described in U.S. Provisional Application No. 63/313,810, filed on Feb. 25, 2022, in the United States Patent and Trademark Office, the entire disclosure of which is hereby incorporated by reference for all purposes. For example, the data ferret may pull transaction records and/or strings and additional transaction content from various external sources that a user has connected to the system, provided permission to access on their behalf from sources like credit agencies, or has been gathered related to the user by the host platform via other means. The transaction data may include transactions, bank statements, account statements, and the like, from various financial accounts.

It should also be appreciated that before the transactions are reconciled, they may be cleaned or otherwise enhanced using transaction records and/or string cleaning. Some of the transaction string cleaning aspects are described herein. But additional transaction string cleaning aspects can be performed, for example, as noted in U.S. patent application Ser. No. 17/342,622, filed on Jun. 9, 2021, in the United States Patent and Trademark Office, which is fully incorporated herein by reference. As an example, cleaned transactions strings output by the host platform may be input to the machine learning system described herein for reconciliation and/or deduplication.

There are multiple categories for reconciliation including identification of possible duplicate transactions, as well as identification of transactions that balance each other. Duplicate transactions are possible when there are transaction records from sources that are replicates of each other and aren't necessarily seen as transactions that balance each other, such as transactions from payroll processors and employers. In this case, the transaction records for evaluation can be limited to the data sources where such overlap might occur, such as payroll processors and depository accounts.

In the example embodiments, matching can be performed by a software program using any combination of parameters between two transactions. In the example embodiments, a number of the matching examples revolve around permutations of comparing various types of data values including dates, amounts, and some combination of payment source, transaction string, and counterparty entity. It is worth noting that the name of the transaction/data source, the transaction string, and the counterparty entity do not have to match between two transactions in order for the machine learning model described herein to match the two transactions together as duplicates or in balancing transaction records. In some embodiments, the machine learning model may include any desired machine learning algorithm including, but not limited to character comparison algorithms (e.g., Naive Bayes algorithm, Boyer Moore algorithm, etc.); deterministic finite automaton (DFA); trie-based algorithms that support parallelism, such as the Aho-Corasick algorithm; hashing-string matching algorithms such as Rabin Karp algorithm; and the like.

The example embodiments may use a variety of techniques to automate the reconciliation and/or deduplication process. As an example, parameter-based exact matching may compare the parameters associated with transactions from different datasets, such as a data source name, date/ time, amount, transaction string, and any metadata that might have been applied to the transaction. An example of this type of metadata is the specification of the counterparty entity that might have been determined, inferred, or otherwise extracted through various means.

The example embodiments may also perform parameter-based "estimated" matching. The estimated matching may take into account that certain parameters may not be exact between the two transactions being matched. For example, a transaction from a payroll processor on a specific date may appear days later in a depository account therefore the dates won't match. Similarly, the amount of a disbursement may not be for the exact amount deposited in a single account, possibly because the payout was split between multiple deposit accounts or because the disbursement incurred a fee that would make the deposit amount slightly less. Many other types of variations are also possible.

In addition, for any transactions that cannot be matched by machine learning and/or related processes, for example, such as through estimated matching, the system may set aside some transactions for manual reconciliation and deduplication. The machine learning model may generate a confidence score, or the like, which indicates how confident the model is in the prediction. If the confidence score is below a predetermined threshold, the software may determine that a match cannot be automatically made and put the transactions into a document or file that can be managed via a user interface, with a ranking or ordering based on confidence scores. Here, the user may perform this task where the other methods have not been successful. In this case, those actions help inform the other methods and improve their future ability to automate the process. This includes the ability to use such input to automatically inform and improve internal algorithms and help train machine learning models.

Exact matching can be performed for reconciliation of transactions where the amount is largely consistent between transactions with little variation. Here, the software may analyze transactions from the data sources where duplication is possible by looking for exact matches of transaction dates, transaction amount, and some combination of data source name, transaction string, and/or counterparty entity.

As described herein, the reconciliation and/or deduplication process can be automated. There are different categories of reconciliation including identification of possible duplicate transactions (e.g., two recitations of the same transaction record) and identification of transactions that balance each other (e.g., two different transactions records from the same transaction such as transaction records from a target entity and a counterparty which are on opposing sides of the transaction such a payor and a payee).

Duplicate transactions are possible when there are records from sources that are replicates of each other and aren't necessarily seen as transactions that balance each other. For example, transactions from payroll processors and employers. In this case, the transactions for evaluation can be limited to the data sources where such overlap might occur such as payroll processors and depository accounts (e.g., credit cards, mortgage accounts, etc. are irrelevant for an analysis of this example). The types of analysis described herein can be done in any combination, sequence, or variation, but revolve around permutations of comparing types of data including transaction dates, payment amounts, and some combination of data source name, transaction string, and entities derived from these attributes, such as, but not limited to, a counterparty entity.

In some embodiments, it is not necessary for two transactions being compared for matching to have a character-for-character match between data source names, between transaction strings, between counterparty entities, or the like. The host platform described herein may implement any number of string match algorithms including, but not limited to, character comparison algorithms such as Naive Algorithm and Boyer Moore Algorithm, Deterministic Finite Automaton (DFA), such as Automaton Matcher Algorithm, trie-based algorithms that support parallelism, such as the Aho-Corasick Algorithm, hashing-string matching algorithms, such as Rabin Karp algorithm, various methods of machine learning, such as natural language processing (NLP) and neural networks. For any variation of the following examples, it should be mentioned that, in the case of multiple possible matches, manual intervention can resolve and record mapping for future automation. In this scenario, manual intervention helps inform machine learning algorithms and improves future reconciliation and deduplication processes.

In some embodiments, exact parameter matching may require a predetermined number of attributes to be an exact match between two transactions for the two transactions to be considered part of a matching transaction. As an example, the minimum number of matching parameters that may be required by the software/model to determine a match is three or more. However, estimated matching may also be performed when there are fewer than the required minimum number of exact matches.

The estimated reconciliation process may rely on "date" windowing. In this example, the algorithm may match two or more parameters exactly, such as amounts and some combination of data source name, transaction string, and counterparty entity, while at the same time allowing for variation in dates of the two transactions. This is similar to the exact parameter matching but allows for variations in dates. For example, the date of a disbursement from a payroll processor might happen several days prior to when the deposit would be seen in a financial account. Date variation could be determined by, but not limited to, recursively incrementing until a match is found or an increment maximum is reached. e.g., allow one day difference and repeat analysis, if no match, repeat with a two-day allowance, etc. up to five days. In this example, the software may begin with a maximum date window value and decrement in the case that multiple matches are found. For example, the software could begin with a five-day date window and if a one-to-one match is found, reconcile the transactions. If there are multiple possible matches, then it could reduce the date window to four days and iteratively repeat the process.

As another example, the estimated reconciliation process may rely on "amount" windowing. In this example, the algorithm may match two or more parameters exactly such as dates and some combination of data source name, transaction string, and counterparty entity, while at the same time allowing for variation in amounts of the two transactions. This is similar to exact parameter matching but allows for variations in amount up to a percentage maximum, absolute maximum, or a combination of the two maxima. For example, it could allow for amounts between transactions to vary for up to 2% or $2, whichever is greater.

As another example, the estimated reconciliation process may determine that two matching parameters is enough to determine a match. For example, if both the payment amount and the payment data match between the two transactions, the remaining combination of data source name, transaction string, and counterparty entity, as well as other attributes, do not need to match. This is similar to exact reconciliation, but only takes into account matching dates and amounts.

As another example, the estimated reconciliation process may determine that a match occurs when only one parameter is an exact match, such as amounts, and may allow variation in the dates of the transaction (date windowing). As another example, the exact match may be with dates, while allowing amount windowing. Meanwhile, other transaction attributes such as data source name, transaction string, counterparty entity, and the like, may vary among the two transactions. This is somewhat similar to estimated reconciliation, except that the combination of data source name, transaction string, and counterparty entity is removed from match requirement. As an example, a payroll disbursement on Jan. 11, 2022 for $600 might reconcile with a deposit on Jan. 14, 2022 for $600 if there are no other potential matches within the date window.

As yet another example, the reconciliation process may identify matching transactions even when none of the parameters of the transactions are an exact match. For example, the software may match together two transactions using date windowing and amount windowing, while ignoring other parameters (attributes) such as data source name, transaction string, counterparty entity, and the like. As an example, a payroll disbursement on Jan. 11, 2022 for $600 might reconcile with a deposit on Jan. 14, 2022 for $598 if there are no other potential matches within the date window.

There also exist scenarios where one transaction may be reconciled to multiple corresponding transactions (e.g., one to multiple reconciliation, etc.). An example of this is a payroll disbursement that is split to multiple depositories. Here, whatever combination of analysis described under one-to-one reconciliation may result in inconclusive results and would normally require manual input to identify duplicates. In this case, one-to-many reconciliation analysis can be performed prior to prompting for that input. The process may accomplish this by focusing on the transactions that failed to find a match in the previous analysis and looking for sums of transactions that sum to the corresponding transaction. This is known as the "Subset Sum Problem" and a number of algorithms can be used to solve this. If unmatched transactions remain after this analysis, then manual input can be gathered as needed.

The software may balance transactions which are duplicate transactions by focusing on identifying transactions from multiple data sources that might be redundant and therefore need to be deduplicated in order to avoid double counting. Balancing transactions can use any of the reconciliation methods listed above, but in order to associate corresponding transactions on both sides of the ledger matching credits and debits. The primary difference is that this process considers the credit and debit aspects of transactions, matching positive transactions to their negative counterparts and vice versa.

Figure 1:
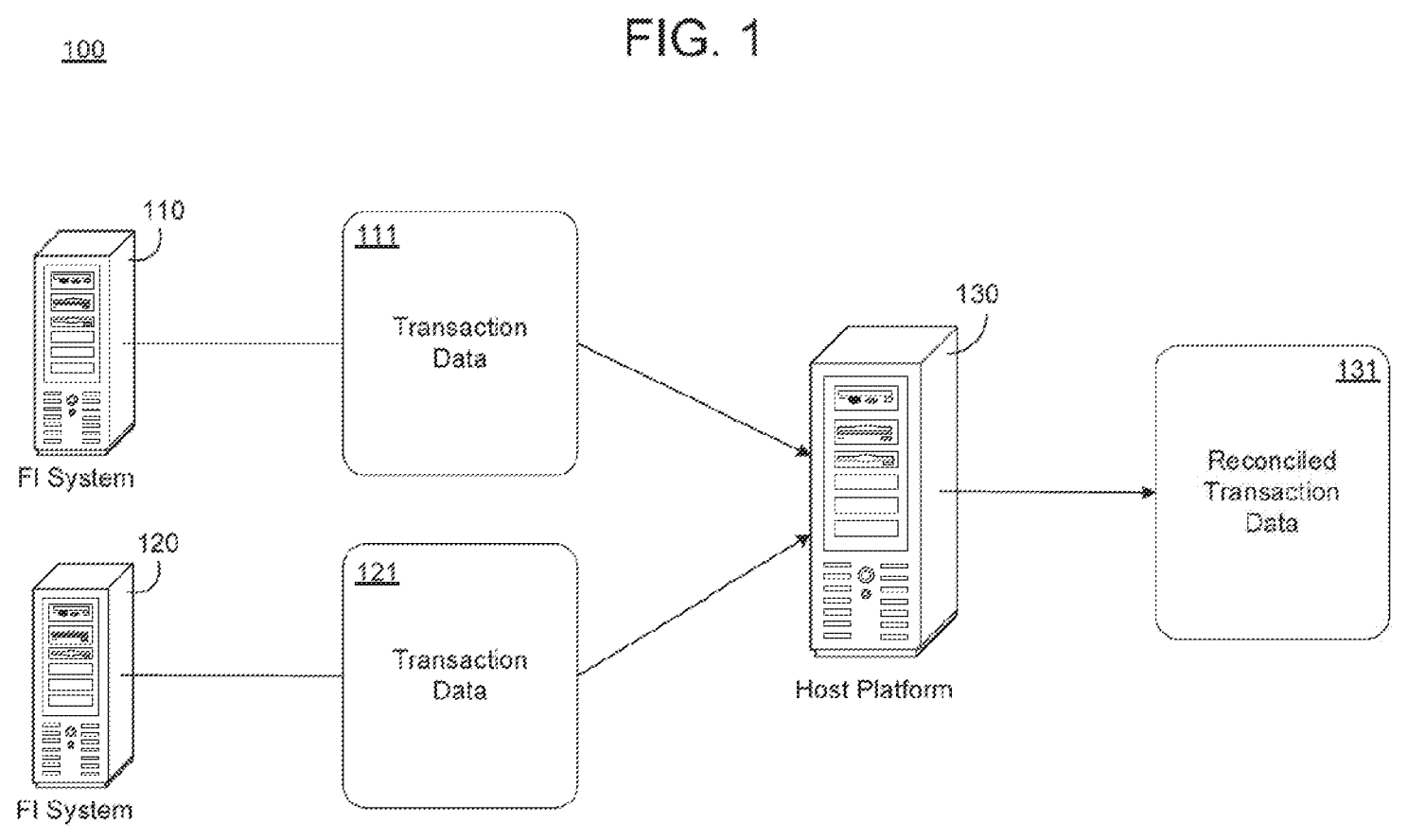

FIG. 1 illustrates a process 100 of reconciling transaction data from different sources in accordance with an example embodiment. In this example, two financial institutions are shown as the sources, but different sources and different number of sources may be used. Referring to FIG. 1, transaction data 111 from a first financial institution 110 may be input to a host platform 130. Likewise, transaction data 121 from a second financial institution 120 may be input to the host platform 130. Here, the transaction data 111 and 121 may include tabular data, spreadsheets, bank statements, XML documents, CSV documents, JSON documents, or the like. Within the transaction data 111 and 121 may include a list or a set of transaction records with various values stored in each record including an amount, a date of the transaction, a source account, and a transaction string. In some embodiments, machine learning may be performed by the host platform 130 to identify counterparty entity identifiers/names and add these identifiers to the transaction data 111 and/or 121.

The host platform 130 may reconcile the transaction records within the transaction data 111 and the transaction data 121 to create a reconciled transaction data 131. Here, the reconciled transaction data record may be created by combining transaction records from the transaction data 111 and the transaction data 121. However, during the combining, the reconciliation process may delete or annotate for exclusion a duplicate transaction record when the host platform identifies duplicate transaction records between the transaction data 111 and the transaction data 121. As another example, the reconciled data 131 may include paired transaction records that are grouped together or are modified to include the identifiers of the other/matched transaction record. Here, the paired transaction records may be transaction records from opposing sides of the transaction which balance each other out.

The reconciled data 131 may include a modified data file corresponding to the transaction data 111 and the transaction data 121. For example, the transaction data 111 may be embodied in a digital document such as a bank account statement, a spreadsheet, a table, a CSV file, a JSON file, an XML file, or the like. Here, the host platform 130 may re-organize or re-arrange transactions within the document such that matched transactions are part of a same record or paired next to each other in the document. As another example, pointers, flags, marks, and the like may be added to the document to identify two transaction records that have been matched together. This additional enhancement of the data file can be used for subsequent processing of the matched transactions, such as by an income verification process, or the like.

FIGS. 2A-2C are diagrams illustrating a process of matching transactions from different accounts in accordance with example embodiments. Referring to FIG. 2A, there is shown a process 200A of matching together duplicate transaction records 210 and 220 which represent the same transaction (i.e., a payroll payment from an employer to an employee.) Here, transaction record 210 represents the transaction record of the payroll process "Acme" and the transaction record 220 represents the transaction record of the employer "Company A". In this case, both transaction records 210 and 220 correspond to sending money to an employee (John Smith). This type of duplication occurs when both the employer transaction records and the payroll processor transaction records are combined, in the case where the payroll processor pays transactions on behalf of the employer.

FIG. 2B is a process 200B of matching a money transfer between two different accounts of the same user. Here, a transaction record 230 corresponds to an account at Bank A from where money is being transferred out of, and a transaction record 240 corresponds to an account at Bank B where the money is being transferred into. These two transaction records 230 and 240 balance each other out since they are opposing sides of the same transaction. Likewise, FIG. 2C is a process 200C of matching a transaction record 250 in which a person makes a payment to a credit card company and a transaction record 260 of the credit card company receiving the payment. Both of these transaction records 250 and 260 balance each other out.

FIG. 3 illustrates a process 300 of matching transactions via a machine learning model 320 in accordance with an example embodiment. Referring to FIG. 3, the machine learning model 320 may receive two different transaction records 310 and 330 from two different financial institutions. Here, the machine learning model 320 may use any combination of exact matching between parameters and estimated matching between the parameters of the two transactions records 310 and 330 to identify that they are related to the same transaction. For example, any of the parameters 311-315 of transaction record 310 may be compared to any of the parameters 331-335 of the transaction record 330 to determine whether or not the two transaction records 310 and 330 are from the same transaction. The words may be vectorized and input into the machine learning model 320 and processed to output a result (i.e., whether or not the two transaction records 310 and 330 match).

FIG. 4 illustrates a process 400 of mapping transaction strings to counterparty entities via a machine learning model 430 in accordance with an example embodiment. Referring to FIG. 4, a translation service (e.g., the translation service 122 in FIG. 1, etc.), may store the machine learning model 430 (or otherwise call the machine learning model 430). Here, the machine learning model 430 may learn mapping relationships between transaction strings 411-415 and corresponding counterparty entities 421-425, respectively, based on historical mappings, which may be manually entered or previously mapped by the machine learning model 430.

As an example, the machine learning model 430 may be a neural network designed for the task of named entity recognition, which in this case classifies each word in a transaction string as part of a counterparty entity name, or not. The neural network in this example may reason this by representing or observing word placement and linguistic dependencies formed by other words in the transaction string. Accordingly, the machine learning model 430 is able to generalize over any transaction string format, as there are numerous possible formats that hard-coded rules would miss. The input data to the machine learning model 430 may be the transaction string itself. In some cases, it may just be the transaction string, or additional data elements may also be input during the prediction such as geographic location data, date/time data, financial institution information data, and the like.

In some embodiments, the input may be the transaction string and the output may be the same data structure (e.g., document, file, table, spreadsheet, etc.) in which the transaction string is input with one or more additional values added including the identified counterparty entity and possibly other data such as date, location, payment type, and the like. In this way, the translation service may modify the input file to include a value or multiple values within a data structure thereof that makes it more helpful for processing by an additional analytics service.

By matching transaction records together, the host platform may be able to create job recommendations at companies in the same or similar industries. That is, transaction data from an employee may be associated with an employer of a job listing. By identifying employers in bank transaction data, the service can aggregate income at the employer and geographic area levels to use in several ways. For example, the additional data may inform users of average/median incomes at companies in the same or similar industries, or in the user's geographic area. Furthermore, the service may track income and hiring trends across companies, industries, and/or geographies.

Identification of employers as well as counterparty entities that do not represent earned income also enables verification of income in aggregate or for specific employers. For example, the host platform may provide verification of income for independent contract workers using these capabilities, but this could also be used in lending, mortgage, or other financial services where verification of income is also needed. In addition, defined counterparty entities can be enhanced with metadata such as industry and required skills for such employment, which allows an additional layer of analysis.

Figure 5B:
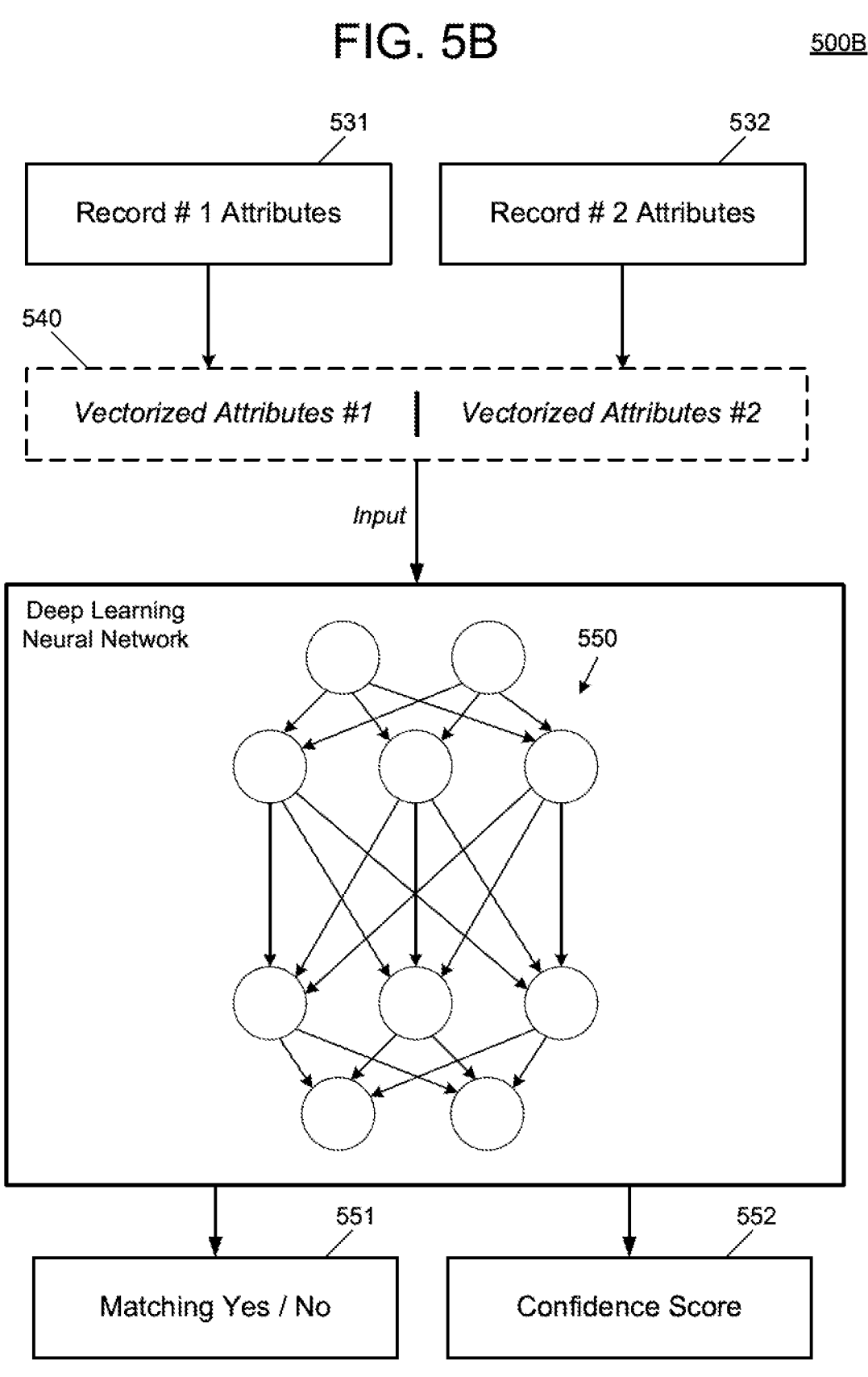
FIG. 5B is a diagram illustrating a process of a machine learning model matching together two transaction records based on the transaction attributes identified in FIG. 5A, in accordance with an example embodiment.

FIGS. 5A and 5B illustrate an example of two machine learning processes that are performed by two machine learning models that work in sequence. However, it should be appreciated that both processes may be performed at the same time by the same machine learning model. In other words, the examples of FIGS. 5A and 5B are not meant to limit the possible use of machine learning by the example embodiments, but merely for purposes of example. The machine learning models described herein may be integrated within a larger machine learning service that is also hosted by the host platform and that can be accessed via application programming interface (API) calls or the like, on the host platform. For example, an API call may specify a particular type of machine learning model to execute from among a plurality/catalogue of machine learning models. The API call may also include the input data (such as the transaction string, etc.) to be processed by the machine learning model/service.

FIG. 5A illustrates a process 500A of a machine learning model identifying transaction attributes from a transaction record in accordance with an example embodiment. FIG. 5B illustrates a process 500B of a machine learning model matching together two transaction records based on the transaction attributes identified in FIG. 5A, in accordance with an example embodiment. As described in these examples, the transaction "attributes" may be considered to be concrete values for transaction "parameters" described herein throughout.

Referring to FIG. 5A, the host platform may select two transaction records 510 and 511 from two different digital documents (e.g., two different bank statements, etc.). These two transaction records 510 and 511 may be processed to identify whether these two transaction representations reconcile to the same transaction. Here, the transaction records 510 and 511 are converted into vectors 521 and 522, respectively. The vectorization process may be performed by any known techniques including natural language processing (NLP), topic modeling, recurrent modeling, bag of words, bag of n-grams, or the like. By converting the contents of the transaction records, which may contain text and other content, into vectors (numerical content), the data can now be input/entered into a machine learning model 530 such as a deep learning neural network or the like.

In response, the machine learning model 530 may identify respective attributes in each of the transaction records. The machine learning model may output transaction attributes 531 identified by the machine learning model 530 from the transaction record 510 and transaction attributes 532 identified by the machine learning model 530 from the transaction record 511. Transaction attributes may include one or more of a payment amount, a payment date, a counterparty entity, a geographical location, and the like. In some cases, no attributes may be identified.

Next, the process 500B may be used to identify whether these two transaction records 510 and 511 reconcile/match a same transaction. Here, the transaction attributes 531 and 532 may be vectorized into a single vector 540 or multiple vectors, and input into a machine learning model 550 which may or may not be a deep learning neural network or any of the other matching models described herein. In response, the machine learning model 550 may output a determination 551 indicating whether or not the two transaction records reconcile to a same transaction and a confidence score 552, indicating a confidence of the prediction (e.g., an accuracy, etc.).

FIG. 6 illustrates a method 600 of matching transactions via machine learning in accordance with an example embodiment. Referring to FIG. 6, the method 600 may be performed by a web server, a cloud platform, an on-premises server, a user device such a personal computer, mobile device, or the like. In 610, the method may include storing a data file comprising a plurality of transaction records corresponding to a plurality of electronic payment transactions, payroll records, or the like, in memory. In 620, the method may include inputting the data file into a first machine learning model and identifying, via the first machine learning model, respective transaction attributes of the plurality of transaction records based on the input data file. In 630, the method may include determining, via execution of a second machine learning model, that a first transaction record and a second transaction record in the data file correspond to a common transaction based on identified attributes of the first and second transaction records, respectively, identified via the first machine learning model. In 640, the method may include modifying the data file to indicate that the first and second transaction records correspond to the common transaction and storing the modified data file in the memory.

In some embodiments, the identifying may include estimating one or more of a date attribute, an amount attribute, and a payment source attribute of the first transaction record via the execution of the machine learning model. In some embodiments, the determining may include determining that the first transaction and the second transaction are from the common transaction based on the estimated one or more of the date attribute, the amount attribute, and the payment source attribute of the first transaction record and one or more of a date attribute, an amount attribute, and a payment attribute included in the second transaction record.

In some embodiments, the identifying may include estimating a counterparty entity attribute of the first transaction record via the execution of the first machine learning model. In some embodiments, the determining may include determining that the first transaction and the second transaction are from opposing sides of the common transaction based on the counterparty identity attribute of the first transaction record identified via the execution of the first machine learning model and a payment source attribute included in the second transaction record.

In some embodiments, the determining may include determining that the first transaction record and the second transaction record are from a common transaction based on differing date attributes included in the first and second transaction records, respectively, via the execution of the second machine learning model. In some embodiments, the determining may include determining that the first transaction record and the second transaction record are from the common transaction based on differing payment amount attributes included in the first and second transaction records, respectively, via the execution of the second machine learning model. In some embodiments, the method may further include converting text from the plurality of transaction records into one or more vectors and inputting the one or more vectors into the first machine learning model during the execution of the first machine learning model. In some embodiments, the method may further include executing a third machine learning model on the modified data file stored in memory to perform an income verification with respect to the plurality of transactions records included in the modified data file.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components.

FIG. 7 is a diagram of a server node 700 according to some embodiments. The server node 700 may host the software application described in the example embodiments and may include a general-purpose computing apparatus that may execute program code to perform any of the functions described herein. The server node 700 may include an implementation of the host platform 130 shown in FIG. 1, in some embodiments. It should also be appreciated that the server node 700 may include other unshown elements according to some embodiments and may not include all of the elements shown in FIG. 7.

Server node 700 includes processing unit(s) 710 (i.e., processors) operatively coupled to communication device 720, data storage device 730, input device(s) 740, output device(s) 750, and memory 760. Communication device 720 may facilitate communication with external devices, such as an external network or a data storage device. Input device(s) 740 may comprise, for example, a keyboard, a keypad, a mouse or other pointing device, a microphone, a knob or switch, an infra-red (IR) port, a docking station, and/or a touch screen. Input device(s) 740 may be used, for example, to enter information into the server node 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM). In some embodiments, the data storage device 730 may store user interface elements in tabular form. For example, one or more columns and one or more rows of user interface elements may be displayed in a two-dimensional spreadsheet, table, document, digital structure, or the like.

Application server 731 and query processor 732 may each comprise program code executed by processing unit(s) 710 to cause server node 700 to perform any one or more of the processes described herein. Such processes may include estimating selectivities of queries on data 733 which may include table data, documents, files, and the like. In some embodiments, the table data may include two-dimensional data such as row-columnar data that is commonly used as an input to a machine learning model. Embodiments are not limited to execution of these processes by a single computing device. In other words, the server 600 may be distributed across multiple devices along with the data such that not all data is stored at one location. Data storage device 730 may also store data and other program code for providing additional functionality and/or which are necessary for operation of server node 700, such as device drivers, operating system files, etc.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:

storing a data file comprising a plurality of transaction records corresponding to a plurality of electronic transactions in memory;

inputting the data file into a first machine learning model;

identifying, via execution of the first machine learning model, respective transaction attributes of the plurality of transaction records based on the input data file;

determining, via execution of a second machine learning model receiving as inputs thereto the transaction attributes of the plurality of transaction records identified by the execution of the first machine learning model, that a first transaction record and a second transaction record in the data file correspond to a common electronic transaction based on attributes of the first and second transaction records identified from the respective first and second transaction records via execution of the first machine learning model and a confidence score indicative of a level of confidence the second machine learning model associates with the determination that the first transaction record and the second transaction record in the data file correspond to the common electronic transaction;

modifying the data file to indicate, within a data structure thereof, that the first and second transaction records correspond to the common transaction, the modifying further including combining unique attributes from the first transaction record and the second transaction record into the data file;

storing the modified data file in the memory;

determining whether the confidence score is below an established threshold;

outputting, in an event the confidence score is determined to be below the established threshold, the first and second transaction records and the confidence score associated with the determination that the first transaction record and the second transaction record correspond to a common electronic transaction;

receiving an indication of an approval or disapproval of the determination that the first transaction record and the second transaction record in the data file correspond to a common electronic transaction;

generating at least one of a trained first machine learning model and a trained second machine learning model by training at least one of the first machine learning model and the second machine learning model, respectively, with training data including the received indication that the first transaction record and the second transaction record in the data file correspond to a common electronic transaction, the trained first machine learning model having an improved ability to identify transaction attributes of transaction records via an execution of the trained first machine learning model and the trained second machine learning model having an improved ability to determine whether multiple transaction records correspond to a common electronic transaction via an execution of the trained second machine learning model; and executing a third machine learning model having an input thereto of the modified data file to verify an income with respect to the plurality of transaction records included in the modified data file.

2. The method of claim 1, wherein the identifying comprises estimating one or more of a date attribute, an amount attribute, and a counterparty attribute of the first transaction record via the execution of the first machine learning model on a transaction string included in the first transaction record.

3. The method of claim 2, wherein the determining comprises determining that the first transaction record and the second transaction are from the common transaction based on the estimated one or more of the date attribute, the amount attribute, and the counterparty attribute of the first transaction record and one or more of a date attribute, an amount attribute, and a counterparty attribute expressly included in the second transaction record.

4. The method of claim 1, wherein the identifying comprises estimating a counterparty entity attribute of the first transaction record via the execution of the first machine learning model on content within the first transaction record.

5. The method of claim 4, wherein the determining comprises determining that the first transaction record and the second transaction record are from opposing sides of the common transaction based on the counterparty identity attribute identified from the first transaction record via the execution of the first machine learning model and a payment source attribute expressly included in the second transaction record.

6. The method of claim 1, wherein the determining comprises determining that the first transaction record and the second transaction record are from the common transaction based on differing date attributes included in the first and second transaction records, respectively, via the execution of the second machine learning model.

7. The method of claim 1, wherein the determining comprises determining that the first transaction record and the second transaction record are from the common transaction based on differing payment amount attributes included in the first and second transaction records, respectively, via the execution of the second machine learning model.

8. The method of claim 1, wherein the method further comprises converting text from the plurality of transaction records into one or more vectors and inputting the one or more vectors into the first machine learning model during the execution of the first machine learning model.

9. The method of claim 1, wherein the determining comprises determining that the first and second transaction records are duplicate transaction records from two different sources, and the modifying comprises deleting one of the duplicate transaction records from the data file to create the modified data file.

10. The method of claim 1, wherein the determining comprises determining that the first and second transaction records comprise balancing credits and debits, and the modifying comprises aggregating attributes from the first and second transaction records into a single transaction record in the modified data file.

11. A computing system comprising:

a memory configured to store a data file comprising a plurality of transaction records corresponding to a plurality of electronic transactions; and a processor configured to:

input the data file into a first machine learning model:

identify, via execution of the first machine learning model, respective transaction attributes of the plurality of transaction records based on the input data file;

determine, via execution of a second machine learning model receiving as inputs thereto the transaction attributes of the plurality of transaction records identified by the execution of the first machine learning model, that a first transaction record and a second transaction record in the data file correspond to a common transaction based on attributes of the first and second transaction records identified from the first and second transaction records via the execution of the first machine learning model and a confidence score indicative of a level of confidence the second machine learning model associates with the determination that the first transaction record and the second transaction record in the data file correspond to the common electronic transaction, modify the data file to indicate, within a data structure thereof, that the first and second transaction records correspond to the common transaction, the modifying further including combining unique attributes from the first transaction record and the second transaction record into the data file;

store the modified data file in memory;

determine whether the confidence score is below an established threshold;

output, in an event the confidence score is determined to be below the established threshold, the first and second transaction records and the confidence score associated with the determination that the first transaction record and the second transaction record correspond to a common electronic transaction;

receive an indication of an approval or disapproval of the determination that the first transaction record and the second transaction record in the data file correspond to a common electronic transaction;

generate at least one of a trained first machine learning model and a trained second machine learning model by training at least one of the first machine learning model and the second machine learning model, respectively, with training data including the received indication that the first transaction record and the second transaction record in the data file correspond to a common electronic transaction, the trained first machine learning model having an improved ability to identify transaction attributes of transaction records via an execution of the trained first machine learning model and the trained second machine learning model having an improved ability to determine whether multiple transaction records correspond to a common electronic transaction via an execution of the trained second machine learning model; and execute a third machine learning model having an input thereto of the modified data file to verify an income with respect to the plurality of transaction records included in the modified data file.

12. The computing system of claim 11, wherein the processor is configured to estimate one or more of a date attribute, an amount attribute, and a counterparty attribute of the first transaction record via the execution of the first machine learning model on the first transaction record.

13. The computing system of claim 12, wherein the processor is configured to determine that the first transaction record and the second transaction record are from the common transaction based on the estimated one or more of the date attribute, the amount attribute, and the counterparty attribute of the transaction record of the first transaction and one or more of a date attribute, an amount attribute, and a counterparty attribute included in the second transaction record.

14. The computing system of claim 11, wherein the processor is configured to estimate a counterparty entity attribute of the first transaction record via the execution of the first machine learning model on content within the first transaction record.

15. The computing system of claim 14, wherein the processor is configured to determine that the first transaction record and the second transaction record are from opposing sides of the common transaction based on the counterparty identity attribute identified from the first transaction record via the execution of the second machine learning model and a counterparty attribute included in the second transaction record.

16. The computing system of claim 11, wherein the processor is configured to determine that the first transaction record and the second transaction record are from the common transaction based on differing date attributes included in the first and second transaction records, respectively, via the execution of the second machine learning model.

17. The computing system of claim 11, wherein the processor is configured to determine that the first transaction record and the second transaction record are from the common transaction based on differing payment amount attributes included in the first and second transaction records, respectively, via the execution of the second machine learning model.

18. The computing system of claim 11, wherein the processor is further configured to convert text from the plurality of transaction records into one or more vectors and input the one or more vectors into the first machine learning model during the execution of the first machine learning model.

19. A non-transitory computer-readable medium comprising instructions which when executed by a processor cause a computer to perform a method comprising:

storing a data file comprising a plurality of transaction records corresponding to a plurality of electronic transactions in memory;

inputting the data file into a first machine learning model;

identifying, via execution of the first machine learning model, respective transaction attributes of the plurality of transaction records based on the input data file;

determining, via execution of a second machine learning model receiving as inputs thereto the transaction attributes of the plurality of transaction records identified by the execution of the first machine learning model, that a first transaction record and a second transaction record included in the data file correspond to a common transaction based on identified attributes of the first and second transaction records, identified from the first and second transaction records via the execution of the first machine learning model and a confidence score indicative of a level of confidence the second machine learning model associates with the determination that the first transaction record and the second transaction record in the data file correspond to the common electronic transaction;

modifying the data file to indicate that the first and second transaction records correspond to the common transaction, the modifying further including combining unique attributes from the first transaction record and the second transaction record into the data file;

storing the modified data file in the memory;

determining whether the confidence score is below an established threshold;

outputting, in an event the confidence score is determined to be below the established threshold, the first and second transaction records and the confidence score associated with the determination that the first transaction record and the second transaction record correspond to a common electronic transaction;

receiving an indication of an approval or disapproval of the determination that the first transaction record and the second transaction record in the data file correspond to a common electronic transaction;

generating at least one of a trained first machine learning model and a trained second machine learning model by training at least one of the first machine learning model and the second machine learning model, respectively, with training data including the received indication that the first transaction record and the second transaction record in the data file correspond to a common electronic transaction, the trained first machine learning model having an improved ability to identify transaction attributes of transaction records via an execution of the trained first machine learning model and the trained second machine learning model having an improved ability to determine whether multiple transaction records correspond to a common electronic transaction via an execution of the trained second machine learning model; and executing a third machine learning model having an input thereto of the modified data file to verify an income with respect to the plurality of transaction records included in the modified data file.

* * * * *